United States Patent

Eisenman et al.

[15] 3,660,659
[45] May 2, 1972

[54] BLACK SUBMILLIMETER RADIATION DETECTOR

[72] Inventors: Wesley L. Eisenman; Douglas C. Arrington, both of Riverside; Richard L. Bates, San Diego; James D. Merriam, Del Mar; Donald L. Stierwalt, El Cajon, all of Calif.

[73] Assignee: The United States of America as represented by the Secretary of the Navy

[22] Filed: Feb. 3, 1971

[21] Appl. No.: 112,157

[52] U.S. Cl. .................................. 250/83.3 H, 250/83 R
[51] Int. Cl. .................................. G01j 1/02, G01j 1/16
[58] Field of Search .................................. 250/83 R, 83.3 H

[56] References Cited

UNITED STATES PATENTS

| | | |
|---|---|---|
| 3,457,409 | 7/1969 | Shenker et al. .................... 250/83.3 H |
| 3,474,249 | 10/1969 | Cussen et al. ...................... 250/83.3 H |
| 3,601,611 | 8/1971 | Kendall, Sr. ....................... 250/83.3 H |

Primary Examiner—Archie R. Borchelt
Attorney—R. S. Sciascia and J. M. St. Amand

[57] ABSTRACT

A radiation detector, as a standard reference for determining the spectral response of any detectors in the submillimeter wavelength region, comprising a conical radiation receiver whose inner surface is coated with black pigment and having a bolometer flake of gallium doped germanium soldered to its outer surface substantially midway, between its base and apex, and a cooled light pipe for introducing radiant energy into the interior of the receiver.

4 Claims, 1 Drawing Figure

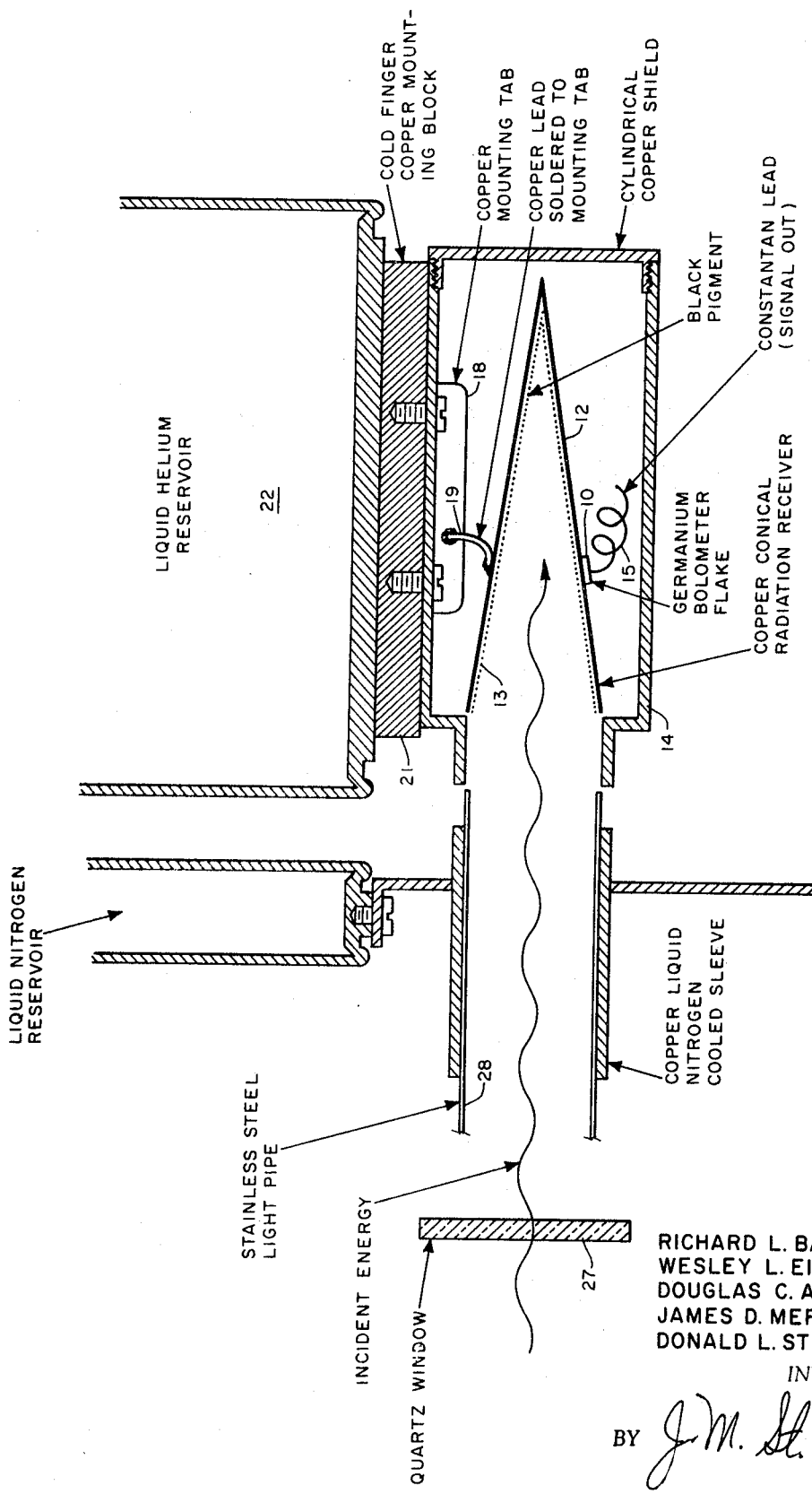
PATENTED MAY 2 1972    3,660,659
RICHARD L. BATES
WESLEY L. EISENMAN
DOUGLAS C. ARRINGTON
JAMES D. MERRIAM
DONALD L. STIERWALT
    INVENTOR.
BY J. M. St. Amand
    ATTORNEY

BLACK SUBMILLIMETER RADIATION DETECTOR

The invention herein described may be manufactured and used by or for the Government of the United States of America for governmental purposes without the payment of any royalties thereon or therefor.

This invention is an improvement over the Black Radiation detector of U.S. Pat. No. 3,188,473 which has a response time of only 0.17 seconds, responsivity of 0.05 volts/watt and operates in the wavelength region of 1 to 40 microns as compared to response time of $8.5 \times 10^{-3}$ seconds, responsivity of 50 volts/watt and operation in the wavelength region of from 1 to 1,000 microns of the black submillimeter detector disclosed herein. The present invention also uses a liquid Helium temperature, Gallium doped Germanium bolometer as an energy sensitive element and has increased responsivity by a factor of 1,000 and a shorter time constant by a factor of 20.

To provide a submillimeter radiation detector to be used as a standard of reference, requires a detector which, within practical limits, will absorb all of the radiation incident upon it over the wavelength region of from 50–1,000 microns with sensitivity to allow use of the detector under normal laboratory operating conditions. Heretofore such a detector was nonexistant.

It is an object of the present invention to provide a submillimeter radiation detector having responsivity of 50 volts/watt and response time of $8.5 \times 10^{-3}$ seconds.

Other objects and many of the attendant advantages of this invention will become readily appreciated as the same becomes better understood by reference to the following detailed description when considered in connection with the accompanying drawings wherein:

The FIGURE of drawing is a diagrammatic cross-sectional view of the black submillimeter radiation detector of the present invention.

As shown in the drawing the detector consists of a liquid helium cooled, gallium doped germanium, bolometer flake 10, of triangular shape and approximately 0.025 inch on a side and 0.009 inch thick, for example, soldered with indium to a point about midway between the apex and the base on the outside of a copper conical radiation receiver 12. The receiver cone 12 is of the general type described in U.S. Pat. No. 3,188,473 and, for example, has dimensions of 9/16 inch at the aperture, 1 ⅝ inches in length with an included angle of 20°, and a wall thickness of 0.0005 inch. The inside of the receiver cone is coated with pigment particles 13 from commercial black paint, for example, having suitable absorption characteristics throughout the spectral range of interest, of from 50 to 1,000 microns. Receiver cone 12 is housed within a cylindrical copper shield 14 open at the area of the open base end of cone 12, as shown in the drawing.

The electrical circuit consists of a 0.004 inch diameter, for example, constantan lead 15 soldered with indium to bolometer flake 10 and fastened to an insulated standoff on mounting tab 18. Soldered to copper mounting tab and to receiver cone 12 is a 0.016 in. diameter, for example, copper lead 19 which is both the mechanical mount and grounding lead for the bolometer-receiver unit 10 and 12.

The detector is cooled by conduction through copper lead 19 attached to the cold finger 21 of a liquid helium dewar 22, for example, via tab 18 and housing 14.

Incident energy is received through a room temperature quartz window 27 and a stainless steel light pipe 28, for example, which is liquid nitrogen cooled and is incident upon the base or aperture of receiver cone 12. The conical cavity geometry coupled with the energy absorption characteristics of the black paint pigment 13 results in almost total absorption of this incident energy.

The heat conductivity of copper is increased by a factor of at least four at 4° Kelvin over room temperature conductivity and the thermal mass is reduced by a factor of approximately 1,000. The conductivity allows a thin walled cone, and still provides an isothermal cavity. The thermal mass is sufficiently reduced to allow a thermal response time of 7 milliseconds.

The gallium doped germanium bolometer flake 10 changes electrical impedance sharply at liquid helium temperatures, providing a sensitive detector of temperature change. Sinusoidally chopped incident energy will produce a sinusoidal resistance change in the detector.

The bolometer flake 10 changes its resistance as a function of its temperature. As incident energy is absorbed by the cone changing the temperature of the cone, the resistance of the bolometer soldered to the cone also changes. A small bias current is passed through bolometer 10, via constantin lead 15 and copper lead 19, and as the resistance of the bolometer changes the voltage drop also changes providing a very sensitive means for detection.

The specific detectivity (i.e., normalized signal to noise ratio) of this black submillimeter radiation detector is $4 \times 10^9$. As a relative comparison, the detectivity of a commonly used detector in this wavelength region, the Golay cell, is $2 \times 10^9$.

What is claimed is:

1. A black submillimeter radiation detector comprising:
    a. a hollow thin-wall cone of highly electrical and heat conductive material having the base thereof open to expose the conical cavity to incident radiation,
    b. the internal surface of said cone being blackened with a coating of material having high absorption characteristics in the wavelength region of 50 to 1,000 microns, this absorption of the coating together with the conical geometry of said cavity resulting in absorption of nearly all incident radiation independent of the wavelength of the incident radiation,
    c. means for mounting and cooling said cone to liquid helium temperature,
    d. a bolometer means electrically mounted on the outside of said cone substantially midway between the base and apex of the cone providing sensitive detection of temperature change.

2. A device as in claim 1 wherein said bolometer is a gallium doped germanium and is soldered to said cone with indium.

3. A device as in claim 1 wherein said cone is shielded except for said base end which is open to incident radiation.

4. A device as in claim 1 wherein said means for mounting and cooling said cone comprising a conductive lead having one end attached to said cone and the other end attached to the cold finger of a liquid helium reservoir, said lead also providing an electrical grounding conductor for said cone and bolometer.

* * * * *